United States Patent [19]

Kaneda et al.

[11] 4,347,565

[45] Aug. 31, 1982

[54] ADDRESS CONTROL SYSTEM FOR SOFTWARE SIMULATION

[75] Inventors: Saburo Kaneda, Yokohama; Takamitsu Tsuchimoto, Kawasaki; Kazuyuki Shimizu, Machida; Fujio Ikegami, Yokohama, all of Japan

[73] Assignee: Fujitsu Limited, Kawasaki, Japan

[21] Appl. No.: 98,989

[22] Filed: Nov. 30, 1979

[51] Int. Cl.³ .......................... G06F 7/00; G06F 9/00
[52] U.S. Cl. .................................................. 364/200
[58] Field of Search ... 364/200 MS File, 900 MS File

[56] References Cited

U.S. PATENT DOCUMENTS

| 3,544,969 | 12/1970 | Rakoczi et al. | 364/200 |
| 3,665,487 | 5/1972 | Campbell et al. | 364/200 |
| 3,955,180 | 5/1976 | Hirtle | 364/200 |
| 3,983,541 | 9/1976 | Faber et al. | 364/200 |

OTHER PUBLICATIONS

"Operating Systems" by Stuart Madnick and John Donovan, Published by McGraw Hill Book Co., New York, ©1974.

Primary Examiner—Raulfe B. Zache
Assistant Examiner—John G. Mills, III
Attorney, Agent, or Firm—Staas and Halsey

[57] ABSTRACT

An address control system for software simulation in a virtual machine system having a virtual storage function. When a simulator program is simulating an instruction of a program to be simulated, an address translation of an operand address in the program to be simulated is achieved using a translation lookaside buffer, thereby greatly reducing the overhead for the address translation during the simulator program execution.

10 Claims, 9 Drawing Figures

ADDRESS CONTROL SYSTEM FOR SOFTWARE SIMULATION

BACKGROUND OF THE INVENTION

1. Field of the Invention

This invention relates to an address control system for software simulation, and more particularly to an effective address control system for translating operand addresses of needed operands for software simulation in a virtual machine system having a virtual storage function.

2. Description of the Prior Art

In recent years, the concept of "virtual machine" has been introduced and attempts have been made to put it into practice. The concept of virtual machine is described in detail, for example, in "IBM System Journal" 1972, No. 2. The utility of a virtual machine may be summarized as follows:

1. It is possible, through utilization of one hardware system, to create an environment that behaves as if each of a plurality of users sharing one computer system uses it all himself.

2. It is possible to virtually establish computer systems of slightly different architectures or system configurations. Accordingly, the use of a virtual machine enables simultaneous running of programs that run under different operating systems, and permits more flexible modification of the system configuration; furthermore, the operating state of the system can be monitored, and each user is free to use the debug function of the machine.

Figure 1:
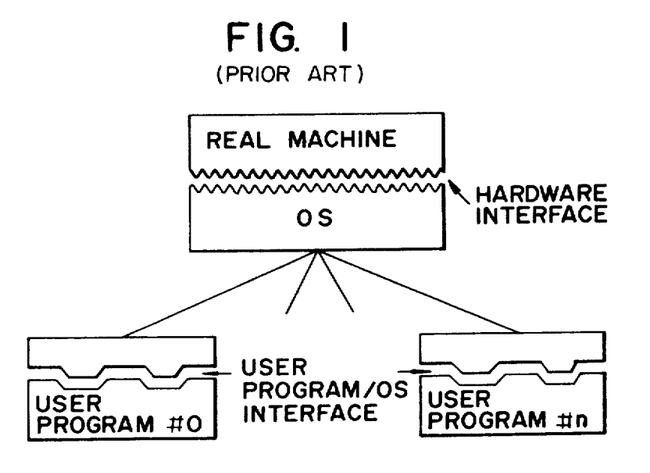
FIG. 1 is a diagram showing the concept of a general machine system heretofore employed.
Figure 2:
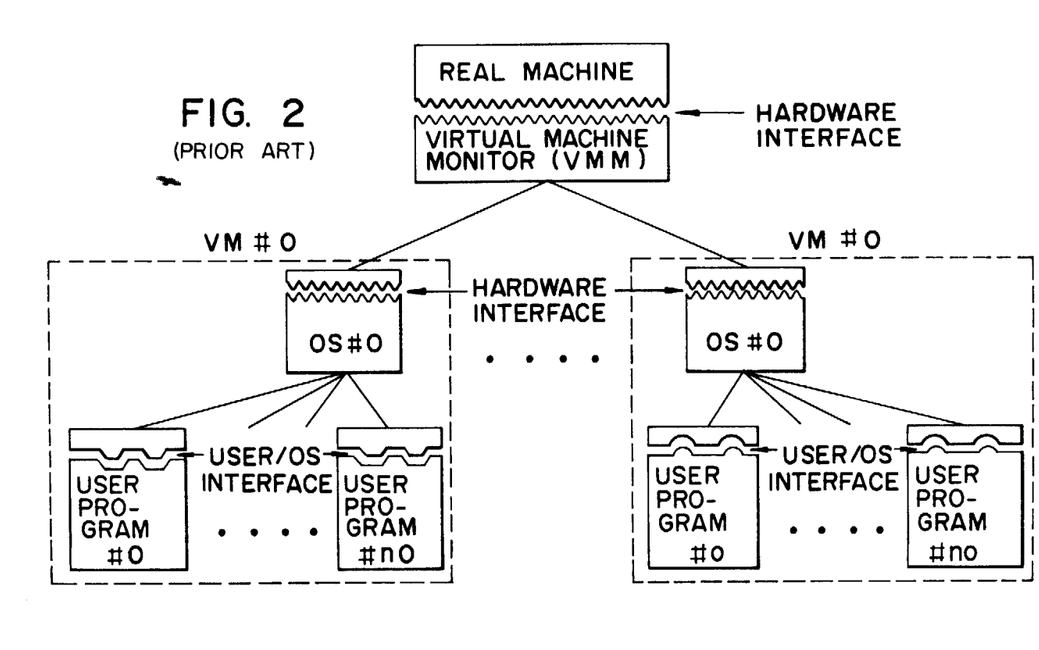
FIG. 2 is a diagram showing the concept of a virtual machine system.

FIG. 1 schematically shows the concept of an ordinary computer system heretofore employed; and FIG. 2 schematically shows the concept of the virtual machine system. In FIGS. 1 and 2, the real machine means computer hardware. Since a plurality of user programs run under the operating system (OS) program, the computer resource (a central processor, a main memory, channels, an input/output controller, an input/output device, and a system console) is managed so that it is shared by respective programs. Between the operating system program and the real machine is provided a conceptual interface called a hardware interface, and between user programs and the operating system is provided a software interface called a user program/OS interface. In the case of the virtual machine system, a program called a virtual machine monitor (VMM) controls a plurality of virtual machine operating systems so that the system resource is shared by the respective programs. In FIG. 2, the broken line blocks each correspond to the conventional ordinary computer system and are each referred to as a virtual machine (VM). Under the virtual machine system, a plurality of virtual machines can be run simultaneously.

Nowadays, multiprogramming techniques are utilized for efficient running of the computer system, and the multiprogramming techniques permits sharing of the system resource by the respective programs. The system resource is controlled by the operating system and can be accessed by an instruction commonly called a "privileged instruction" which only the operating system can issue.

Each user program is assigned to the "problem mode," and when the user program issues the aforementioned privileged instruction, a program interruption called a "privileged-operation exception" is detected by the hardware.

In the case of the virtual machine, a plurality of conventional operating systems can be run at the same time; consequently, the system resource controlled by the operating systems programs in the past are controlled by the program referred to as the virtual machine monitor (VMM). The user programs, including the operating systems used, are all assigned to the "problem mode," and only the virtual machine monitor operates in a "privileged mode." Accordingly, when the operating system program of each user tries to execute the "privileged instruction," a program interruption is detected and execution control is transferred to the virtual machine monitor, which simulates this "privileged instruction."

The virtual machine monitor has such functions as follows:

The virtual machine monitor:

(1) Controls the user programs (including the operating systems) in order to share the system resource efficiently;

(2) Simulates the "privileged instruction" for each operating system;

(3) Receives all interrupts (including an I/O interrupt, an external interrupt and an interrupt accompanying related to virtual memory) and performs processing according to the interruption sources and, if necessary, posts the interruption to each operating system.

The virtual machine has such advantages as mentioned previously, but in the case of running a program under the virtual machine, performance degradation is caused to some extent due to an execution time overhead peculiar to the virtual machine, as compared when running the same program under the operating system of an ordinary computer heretofore employed. The overhead can be divided into direct and indirect ones as follows:

(1) Direct execution time overhead

This occurs mainly in the course of processing by software of the virtual machine monitor and this type of overhead is as follows:

(a) Overhead due to simulation of the privileged instruction

As described above, each user program including the operating system used heretofore is assigned to the "problem mode," privileged instructions issued by the operating system are all simulated by the virtual machine monitor thus requiring extra processor cycles to execute the priviledged instruction.

(b) Overhead for switching control between user programs (c) Overhead for supporting the virtual memory function of the operating system (d) Overhead for translation of channel program instructions A channel program for starting an input/output device by the operating system sends a logical address to a host computer; therefore, the virtual machine monitor must translate the logical address to a real address of the host computer.

(e) Overhead for supporting interruptions and interrupt processing

In the virtual machine, each interruption is indexed by the virtual machine monitor, so that if this interruption is required, it must be reflected in the status of the operating system program; this processing is carried out by the virtual machine monitor.

(f) Overhead for supporting the console input output function

The virtual machine monitor supports the console function, including the debug function.

(2) Indirect execution time overhead

In the existing operating system, various resource algorithms are incorporated in the software system for allocation and management of the system resource so as to enhance its availability, but when run under the virtual machine system, these algorithms may in some cases produce inefficient results.

Next, the prior art will be described in connection with the simulation of the privileged instruction.

Since each user program, including the operating system used therefor, is assigned to the "problem mode" as described above, the privileged instructions issued by the operating system are all detected as "privileged-operation exceptions" and indexed by the virtual machine monitor (VMM) program. Then, the virtual machine monitor (VMM) program simulates the privileged instruction in the following manner. When a program interrupt of the "privileged-operation exception" is detected, an old program status word (PSW), an interruption code, etc. are loaded into a prefix area. After saving a general purpose register in a working area of the virtual machine monitor (VMM), the virtual machine monitor (VMM) reads from a virtual machine (VM) area the operation code of the instruction having issued the privileged-operation exception from the old program status word and, after an operand address computation corresponding to the operation code is computed from the contents of a field of the instruction and the saved general purpose register, transfers control to the instruction processing routine corresponding to the operation code.

In the instruction processing routine, the required operand is read from or written in the virtual machine monitor (VMM) area, or read from and written in the virtual machine (VM) area.

Figure 3:
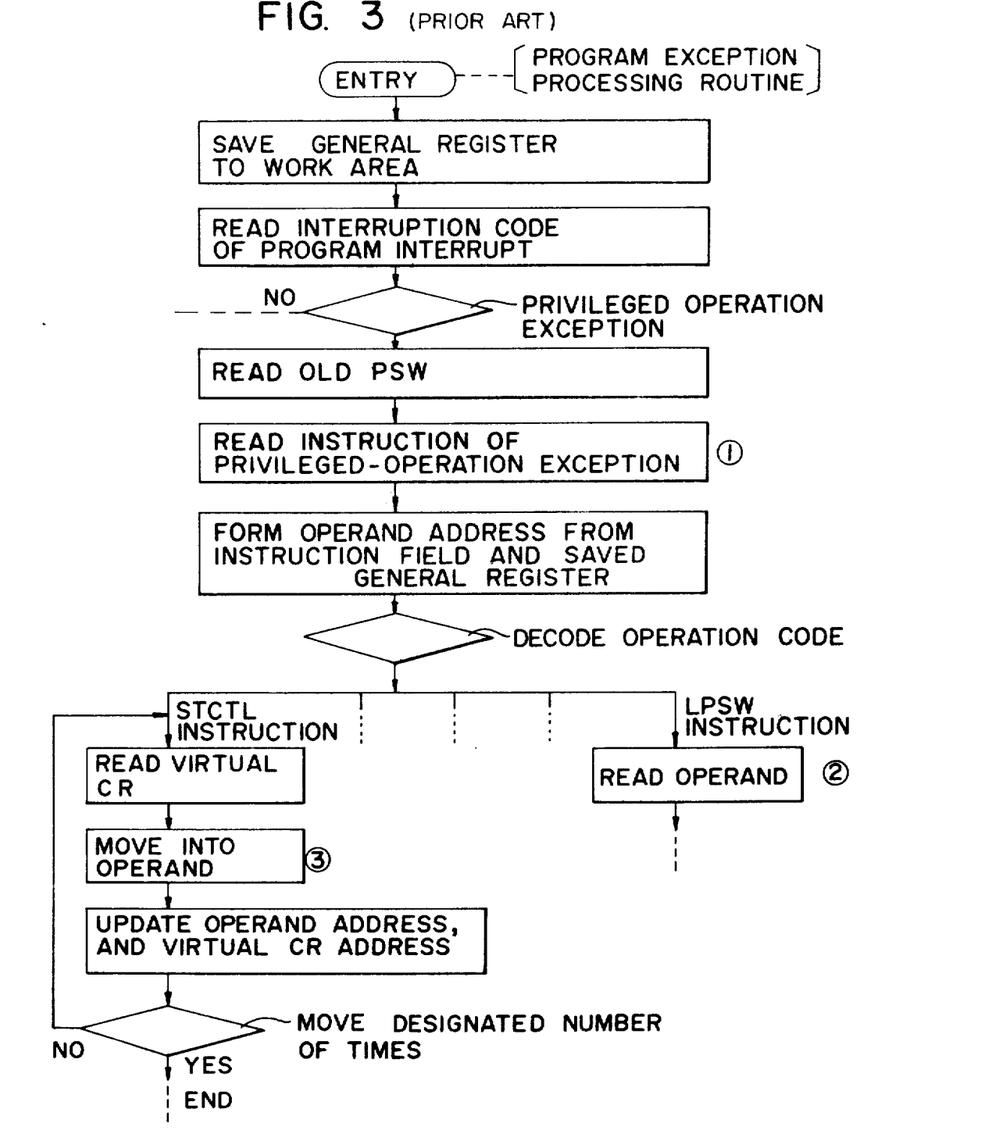
FIG. 3 is a flow chart showing processing of a virtual machine monitor (VMM)

FIG. 3 shows a process chart of the virtual machine monitor (VMM). In the flowchart of FIG. 3, processing of steps ①, ② and ③ is accompanied by read-write of an operand in the program area of the virtual machine (VM). The program of the virtual machine monitor (VMM) operates in the real address mode for supporting a virtual memory for the operating system. Accordingly, in the processing steps ①, ② and ③, when the program area of the virtual machine (VM) is accessed, the logical address of the operand is translated into a real address using an instruction explicitly instructing an address translation (a load real address instruction) and then the main memory is accessed with the real address thus obtained. Since the load real address instruction usually does not use a translation lookaside buffer (TLB) for loading a pair of logical and real addresses, a segment table and a page table on the main memory are always accessed for dynamic address translation (DAT), resulting in an appreciable amount of overhead.

Especially in the case of accessing a plurality of operands of different locations by one instruction, the execution time overhead necessary for the dynamic address translation (DAT) becomes extensive.

SUMMARY OF THE INVENTION

This invention has as an object the reduction of the "overhead due to address translation during the simulation of a privileged instruction."

The above objective is achieved by providing an address control system for software simulation in a data processor. The data processor has a translation device for coordinating an address on a program with a main memory address and has a function of simulating the execution of an instruction of a program to be simulated by the execution of one or more instructions of a simulator program. This address control system includes a first device for holding information for discriminating the operating state or virtual machine monitor state of the simulator program and the operating state of the program to be simulated or the virtual machine state. It also includes a second device for holding address translation control information for coordinating the address of the program to be simulated with the address in the main program when the simulation is accomplished by the simulator program. In addition, a third device is included for holding address translation control information for coordinating the address of the simulator program with the address in the main memory. The invention includes a fourth device for indicating the selection of either the second or third means during the operation of the simulator program. The second means is selected when the program data to be accessed resides in the simulated program and the third means is selected when the program data to be accessed resides in the simulator program. The address translation is assisted by the first, second, third and fourth means.

DESCRIPTION OF THE PREFERRED EMBODIMENTS

Figure 4:
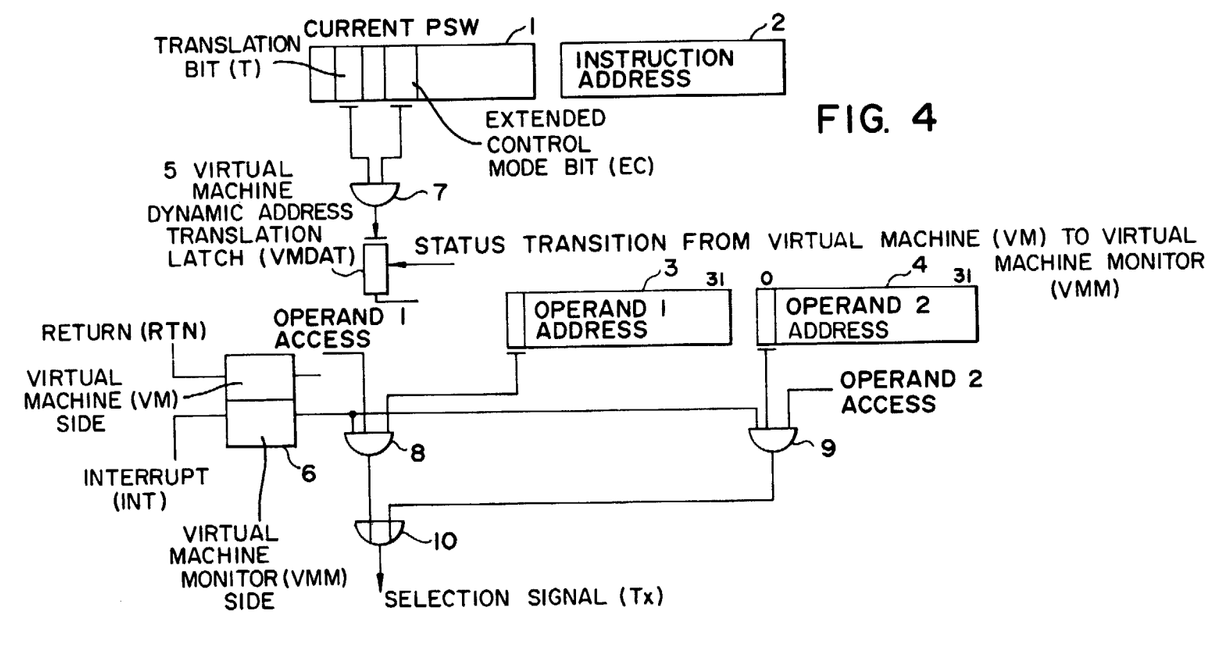
FIG. 4 is a block diagram illustrating the construction of an address control circuit according to a first embodiment of this invention.

With reference to the drawings, the present invention will hereinafter the program status word describe in detail. FIG. 4 illustrates an address control circuit produced in accordance with a first embodiment of the present invention. In FIG. 4, reference numeral 1 indicates a first word of a program status word (PSW) register; 2 designates a second word of the PSW register; 3 identifies an operand one-address register; 4 denotes an operand two-address register; 5 represents a virtual machine dynamic address translation (VMDAT) latch; 6 shows a status indicate latch; 7 to 9 refer to AND gates; and 10 indicates an OR gate. Upon detection of a program exception during execution of a user program (including an operating system), an interruption occurs and, according to address translation control information in PSW controlling the dynamic address translation (DAT) at that time, the VMDAT latch 5 is set. In concrete terms, during the operation of each user program, when a bit (EC bit) indicating an extended control mode and a bit (T bit) indicating an address translation are both "1," the VMDAT latch 5 is set at the moment of occurrence of status transition from the virtual machine (VM) state to the virtual machine monitor (VMM) state (that is, at the moment of occurrence of an interruption in the VM state). Then, replacement of PSW takes place to load a PSW of the virtual machine monitor (VMM) in each of the PSW registers 1 and 2. When the program exception is detected, an interruption (INT) input of the state indicate latch 6 becomes "1" and the state indicate latch 6 outputs "1," indicating the virtual machine monitor (VMM) state. The state indicate latch 6 is adapted to output "1" on the VM side and "0" on the VMM side when a return (RTN) instruction is issued for the transfer of control to the virtual machine (VM) after completion of simulation by the virtual machine monitor (VMM). The virtual machine monitor (VMM) controls bit 0 of the operand address register and, when an address translation is required, sets the value of the bit 0 to "1." By this setting, the state indicate latch 6 indicates the virtual machine monitor (VMM) state ("1" at the output of the VMM side), and when the bit 0 of the operand address register is "1," the operand address corresponding thereto is accessed, by which the AND gate 8 or 9 corresponding to the accessed operand address outputs "1," and thus, outputting from the OR gate 10 a selection signal Tx indicating that the execution of an address translation using address translation information of the VM program can be accomplished during the WMM program operation. In other words, when the operand address (logical address) bit 0 is "1" an address translation is performed by accessing, through utilization of address translation information of the virtual machine, a translation lookaside buffer (TCB) or a translation table in the virtual machine.

Figure 5:
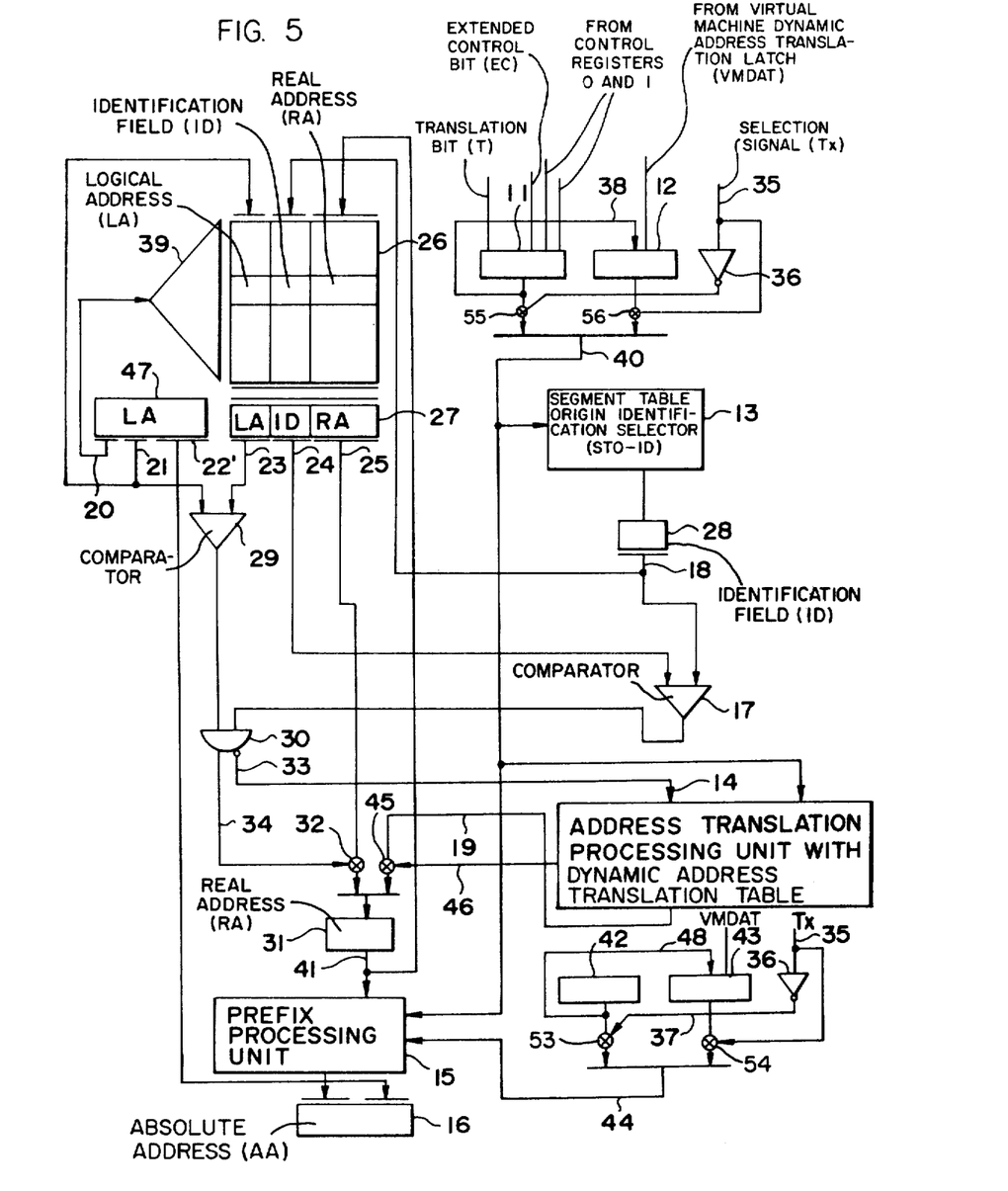
FIG. 5 is a block diagram illustrating the construction of an address translation circuit according to this invention.

FIG. 5 shows an address translation circuit according to the present invention. In FIG. 5, reference numeral 11 indicates a current address translation control information register; 12 designates a preceding address translation control information register; 13 identifies a segment table origin identification (STO-ID) selector; 14 denotes an address translation processing unit with a DAT table; 15 represents a prefix processing unit; 16 shows an absolute address register; 17 refers to a comparator; 18 indicates a bus for transferring the output from an identification (ID) register 28, described later, to the comparator 17 and a translation lookaside buffer (TLB) 26 described later; 19 designates a bus for a real address translated by the address translation porcessing unit 14; 20 identifies one part of a logical address which is to be translated and is used for addressing the TLB 26; 21 denotes one part of the logical address which is to be translated and is compared with data of a logical address field read from the TLB 26; 22 represents a low-order bit of the logical address; 23 identifies a bus for transferring a logical address field of an entry read from the TLB 28 to a comparator 29 described later; 24 refers to a bus for transferring an identification field of the entry read from the TLB 26 to the comparator 17; 25 indicates a bus for transferring a real address field of the entry read from the TLB 26 to a register 31 described later; 26 designates a translation lookaside buffer (TLB) which is formed by a memory packaged in a central processing unit (CPU) for achieving a dynamic address translation at high speed; 27 identifies a buffer register for receiving the entry read from the TLB 26; 28 denotes an ID register; 29 represents a comparator; 30 shows an AND circuit; 31 refers to a real address register; 32 indicates a gate; 33 designates a signal indicating a failure of the translation attempt by the TLB 26; 34 identifies a signal indicating success of the translation by the TLB 26; 35 denotes an address information select signal; 36 represents an inverter; 37 represents the output from the inverter 36; 38 shows a bus for transferring the content of the register 11 to the register 12; 39 indicates a decoder; 40 designates a bus for address control information selected by a signal Tx 35; 41 identifies a bus for transferring the output from the real address register 31 to the prefix processing unit 15 and the TLB 26; 42 denotes a register for holding a prefix value of a program under execution; 43 represents a register for holding the content shifted thereto from the register 42 during the status transition from the virtual machine (VM) to the virtual machine monitor (VMM); 44 shows a bus for transferring a prefix value selected by the signal Tx 35 to the prefix processing unit 15; 45 refers to a gate; 46 indicates a control signal which becomes "1" when the address translation by the dynamic address translation table (DAT table) succeeds; 47 designates a logical address register and 53, 54, 55 and 56 indicate gates.

In FIG. 5, the current address translation control information register 11 stores the translation bit (T bit) and the EC bit of the current PSW and dynamic address translation control information of control registers $CR_0$ and $CR_1$. The preceding address translation control information register 12 is loaded with the content of the current address translation control information register 11 when there is a Status transition from the virtual machine (VM) to the virtual machine monitor (VMM). The ID selector 13 is composed of a segment table origin stack circuit and a control circuit therefor and responds to the address control information of register 12 to select ID information corresponding thereto. The address translation processing unit 14 with the DAT table is a processing control unit which performs dynamic address translation using the DAT table in main memory when the address translation by the TLB 26 has ended in a failure. For the address translation information employed in this case, use is made of the information of the register 11 or 12 selected by the signal Tx 35. The real address converted at the moment of completion of the address translation by the address translation unit using the DAT table is written in the TLB 26 together with one part of the logical address on the bus 21 and the ID on the bus 18.

The prefix processing unit 15 performs prefix processing using the value of a prefix register selected by the signal Tx 35. The address translated by the prefix processing unit 15 is set in a high-order bit of the register 16, and a low-order bit of the logical address 22 is set in a low-order bit of the register 16. By the address in the register 16, the main memory is accessed.

The comparator 17 compares the ID information read from the ID selector 13 with information read from the TLB 26 and outputs "1" in the case of coincidence. Thecomparator 29 compares one part of the logical address to be translated and the logical address field of the read TLB entry and outputs "1" in the case of coincidence.

The arrangement of FIG. 5 differs from the conventional arrangement in that the register for loading the address translation control information is selected by the address information select signal Tx 35. That is, when the signal Tx is "1," information from the preceding address translation control information register 12 and information of the register 43 for holding the preceding prefix value are selected by corresponding gates 54 and 56. This enables the virtual machine monitor (VMM) to perform address translation using address information of the virtual machine (VM).

When the signal Tx is "0," information of the current address translation control information register 11 and information of the register 42 for holding the current prefix value are selected by the corresponding gates 53 and 55. The addressing in the prior art corresponds to the case of the signal Tx being "0."

As described above, when the program of the virtual machine monitor (VMM) needs to use a logical address operand in the program of the virtual machine (VM) executed immediately before, the address translation corresponding to the operand can be achieved using the translation lookaside buffer rather than the address translation processing unit.

Figure 6:
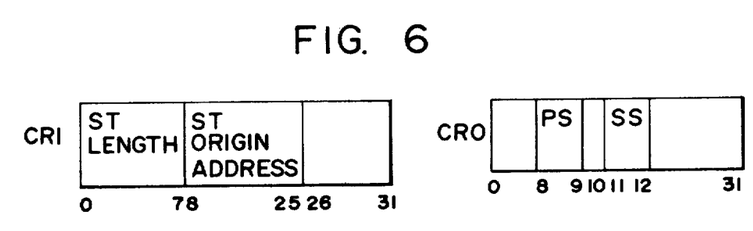
FIG. 6 is a diagram showing dynamic address translation (DAT) control information loaded in a control register.

FIG. 6 shows dynamic address translation control information loaded in the control registers CR$_0$ and CR$_1$ of the current address translation control information register 11. As depicted in FIG. 6, the control register CR$_1$ loads the ST length in bits 0 to 7 and the ST origin address in bits 8 to 25, and the control register CR$_0$ loads the page size (PS) in bits 8 and 9 and the segment size (SS) in bits 11 and 12.

No description will be given of the control for achieving the dynamic address translation based on the information loaded in the control registers, since it is set forth in detail in "IBM System/370 Principles of Operation, GA 22-700, File No. S/370-01."

Figure 7:
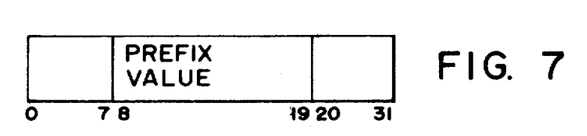
FIG. 7 is a diagram showing the content of a prefix register.

FIG. 7 shows the content of the prefix register 42. As depicted in FIG. 7, the prefix value of program is held in bits 8 to 19.

Figure 8:
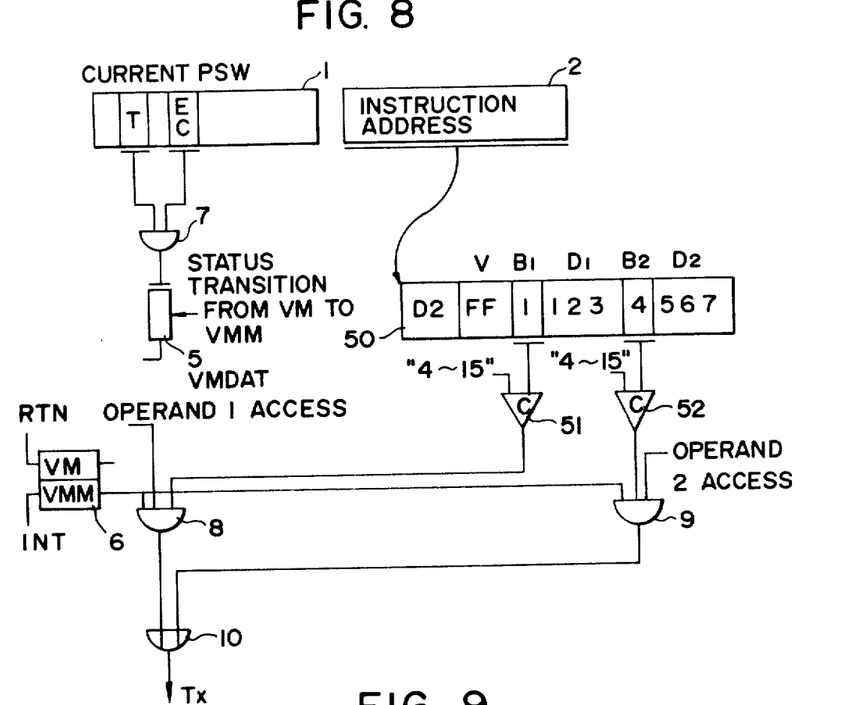
FIG. 8 is a block diagram illustrating the construction of an address control circuit according to a second embodiment of this invention.

FIG. 8 illustrates an address control circuit according to a second embodiment of this invention. In FIG. 8, the same reference numerals as those in FIG. 4 indicate the same parts; and reference numeral 50 designates an instruction register, and 51 and 52 identify comparators. In this embodiment, it is determined whether to perform real address control by register addressing or address translation control, by the status of the VMDAT latch 5 and in response to the register number indicated in a register indicate field of an instruction in the virtual machine monitor (VMM) state.

Let it be assumed, for example, that general purpose registers 0 to 3 are subjected to the address control of the current program status word and that general purpose registers 4 to 15 are subjected to the address translation control by the VMDAT latch.

In FIG. 8, comparator 51 checks whether or not the register number indicated by a part B$_1$ of the instruction register 50 is included in general purpose register numbers 4 to 15; and comparator 52 checks whether or not the register number indicated by a part B$_2$ of the instruction register 50 is included in the general purpose register numbers 4 to 15.

When the state indicate latch 6 indicates the virtual machine monitor (VMM) state ("1" at the output of the VMM side) and the operand register number in the instruction address is included in the general purpose register numbers 4 to 15, the corresponding operand address is accessed, by which the output from the corresponding AND gate 8 or 9 becomes "1," thus outputting the address information selection signal Tx from the OR gate 10. The subsequent operation is the same as in the first embodiment.

Figure 9:
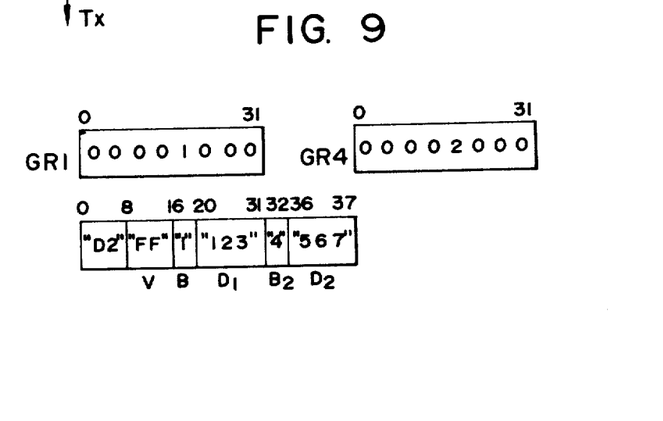
FIG. 9 is a diagram showing an example of the content of a register during the execution of a move character instruction.

FIG. 9 shows an example of the register content during the execution of the move character (MVC) instruction. The MVC instruction has the function by which data of an area in a main memory corresponding to the byte number indicated in a part V using, as an origin address, the value of the part D$_2$ added to the value of the general purpose register indicated by the part B$_2$ (operand 2), is transferred to an area of the main memory using, as an origin address, the value of the part D$_1$ added to the value of the general purpose register indicated by the part B$_1$ (operand 1). In FIG. 9, the value of the part B$_1$ is "1" and is not included in the general purpose register numbers 4 to 15, so that the output from the comparator 51 becomes "0" and the signal also becomes "0," resulting in the operand 1 being subjected to the address translation control by the virtual machine monitor (VMM). Since the value of the part B$_2$ is "4" and included in the general purpose register numbers 4 to 15, the second operand is subjected to the immediately preceding address translation control by the virtual machine (VM); when the value of the VMDAT latch is "0," a real address "00002567" is provided and when the value of the VMDAT latch is "1," a logical address "00002567" is provided. In this second embodiment, the correlation between the register number and the address translation control can be changed arbitrarily according to processing.

As has been described in the foregoing, according to this invention, when a simulator program simulates an instruction of a program to be simulated, the address translation of an operand address of the program to be simulated can be achieved using a translation lookaside buffer, so that the overhead for the address translation in the execution of the simulator program can be greatly reduced. Although the present invention has been described above in connection with the case where the execution of a privileged instruction in the virtual machine is simulated by software called the virtual machine monitor (VMM) program, it is evident that the invention can easily be applied to the cases of simulating the execution of an instruction not only of the virtual machine program but also of other software.

It will be apparent that many modifications and variations may be effected without departing from the scope of the novel concepts of this invention.

What is claimed is:

1. An address control system for software simulation in a data processor, wherein the data processor has a prefix processing unit for producing an absolute address signal, coordinates logical and real addresses of a virtual machine simulated program and a virtual machine monitor simulator program in a main memory, and simulates the execution of a simulated instruction by the execution of at least one of the instructions of the virtual machine monitor simulator program, said system comprising:

first means for holding information for discriminating the operating state of the virtual machine monitor simulator program and the operating state of the virtual machine simulated program;

second means, operatively connected to the prefix processing unit, for holding preceding address translation control information and a preceding prefix signal which are both used by the data processor for coordinating a simulated logical operand address with a simulated real operand address in the main memory, when the simulation is performed by the virtual machine monitor simulator program;

third means, operatively connected to the prefix processing unit, for holding current address translation control information and a current prefix signal which are both used by the data processor for coordinating a simulator logical operand address with a simulator real operand address in the main memory; and fourth means, operatively connected to said first, said second and said third means, for indicating the selection of the contents of either said second means or said third means as a translation input to the prefix processing unit of the data processor during the operation of the simulator program, the contents of said second means being selected when a simulated operand to be used resides in the virtual machine simulated program, and the contents of said third means being selected when a simulator operand to be used resides in the virtual machine monitor simulator program.

2. An address control system according to claim 1, wherein said fourth means comprises a general purpose register used for operand address computation.

3. An address control system according to claim 1, wherein said fourth means further comprises one part of the simulated logical operand address.

4. An address control system according to claim 2 or 3, wherein the data processor has a translation lookaside buffer and when the translation lookaside buffer is used for translation, when the first means indicates the operating state of the virtual machine monitor simulator program, when the second means contains preceding address translation control information indicating the need for a translation and when the fourth means indicates an address translation, address translation is achieved using the preceding address translation control information and the preceding prefix signal held in the second means.

5. An address control system for software simulation in a data processor, wherein the data processor has a prefix processing unit for producing an absolute address signal, coordinates logical and real addresses of a virtual machine simulated program and a virtual machine monitor simulator program in a main memory, and simulates the execution of a simulated instruction by the execution of at least one of the instructions of the virtual machine monitor simulator program, said system comprising:

first means for holding information indicating that the data processor has stopped executing the virtual machine simulated program and started executing the virtual machine monitor simulator program;

second means, operatively connected to the prefix processing unit, for holding preceding address translation control information and a preceding prefix signal which are both used by the data processor for coordinating a simulated logical operand address with a simulated real operand address in the main memory, when the simulation is performed by the virtual machine monitor simulator program;

third means, operatively connected to the prefix procesing unit, for holding current address translation control information and a current prefix signal which are both used by the data processor for coordinating a simulator logical operand address with a simulator real operand address in the main memory; and fourth means, operatively connected to said first, said second and said third means, for indicating the selection of the contents of either said second or said third means as a translation input to the prefix processing unit of the data processor during the operation of the simulator program, the contents of said second means being selected when a simulated operand to be used resides in the virtual machine simulator program, and the contents of said third means being selected when a simulated operand to be used resides in the virtual machine monitor simulator program.

6. An address control system as recited in claim 1 or 5, wherein said first means is operatively connected to receive a translation bit signal and an extended control bit signal from a current program status word, said first means comprising:

and AND gate having a first input operatively connected to receive the translation bit signal, having a second input operatively connected to receive the extended control bit signal and having an output; and a virtual machine dynamic address translation status latch, having an input operatively connected to the output of said AND gate and having an output, for indicating a status transition from the virtual machine simulated program to the virtual machine monitor simulator program by generating a transition signal.

7. An address control system as recited in claim 1 or 5, wherein said fourth means is operatively connected to receive an interrupt signal, an operand one access signal and an operand two access signal, said fourth means comprising:

a virtual machine monitor interrupt latch, having an input operatively connected to receive the interrupt signal and having an output, for generating a virtual machine monitor interrupt signal;

a first operand address register having a first bit output;

a second operand address register having a first bit output;

a first AND gate having a first input operatively connected to receive the virtual machine monitor interrupt signal, having a second input operatively connected to receive the operand one access signal, having a third input operatively connected to the first bit output of said first operand address register and having an output;

a second AND gate having a first input operatively connected to receive the virtual machine monitor interrupt signal, having a second input operatively connected to receive the operand two access signal, having a third input operatively connected to the first bit output of said second operand address register and having an output; and an OR gate, having a first input operatively connected to the output of said first AND gate, having a second input operatively connected to the output of said second AND gate and having an output, for generating a selection signal at its said output.

8. An address control system as recited in claim 1 or 5, wherein said fourth means is operatively connected to receive an interrupt signal, an operand one access signal, an operand two access signal, first through eleventh register input signals and instruction address information including first and second general purpose register numbers, said fourth means comprising:

a virtual machine monitor interrupt latch, having an input operatively connected to receive the interrupt signal and having an output, for generating a virtual machine monitor interrupt signal;

an instruction address register, containing the instruction address information, having a first output for generating a first general purpose register number signal and having a second output, for generating a second general purpose register number signal;

a first comparator circuit, having a first input operatively connected to receive the first through eleventh register input signals, having a second input operatively connected to receive the first general purpose register number signal, and having an output, for generating a first equal signal whenever the first general purpose register number signal is in coincidence with one of the first through eleventh register input signals;

a second comparator, having a first input operatively connected to receive the first through eleventh register input signals, having a second input operatively connected to receive the second general purpose register number signal and having an output, for generating a second equal signal whenever the second general purpose register number signal is in coincidence with one of the first through eleventh register input signals;

a first AND gate having a first input operatively connected to receive the virtual machine monitor interrupt signal, having a second input operatively connected to receive the operand one access signal, having a third input operatively connected to receive the first equal signal and having an output;

a second AND gate having a first input operatively connected to receive the virtual machine monitor interrupt signal, having a second input operatively connected to receive the operand two access signal, having a third input operatively connected to receive the second equal signal and having an output; and an OR gate, having a first input operatively connected to the output of said first AND gate, having a second input operatively connected to the output of said second AND gate and having an output, for generating a selection signal.

9. An address control system as recited in claim 1 or 5, wherein said second means is operatively connected to said third means, said third means generates preceding address translation control information and a preceding prefix signal and said second means is operatively connected to receive a transition signal and a selection signal, said second means comprising:

a first register, having a first input operatively connected to receive the transition signal and having a second input operatively connected to receive the preceding address translation control information, for storing and outputting the preceding address translation control information upon receipt of the transition signal;

a first gate circuit, having a first input operatively connected to said first register for receiving the preceding address translation control information, having a second input operatively connected to receive the selection signal and having an output operatively connected to the prefix processing unit, for passing therethrough the preceding address translation control information upon receipt of the selection signal;

a second register, having a first input operatively connected to receive the transition signal and having a second input operatively connected to receive the preceding prefix signal, for storing and outputting the preceding prefix signal upon receipt of the transition signal; and a second gate circuit, having a first input operatively connected to said second register for receiving the preceding prefix signal, having a second input operatively connected to receive the selection signal and having an output operatively connected to the prefix processing unit, for passing therethrough the preceding prefix signal upon receipt of the selection signal.

10. An address control system as recited in claim 1 or 5, wherein said third means is operatively connected to receive a selection signal, said third means comprising:

a first register, having an input operatively connected to receive the current address translation control information and having an output, for storing and outputting the current address translation control information;

a NOT circuit, having an input operatively connected to receive the selection signal and having an output, for generating a current selection signal;

a first gate circuit, having a first input operatively connected to said first register for receiving the current address translation control information and having a second input operatively connected to said NOT circuit for receiving the current selection signal, for passing therethrough the current address translation control information upon receipt of the current selection signal;

a second register, having an input operatively connected to receive the current prefix signal and having an output, for storing and outputting the current prefix signal; and a second gate circuit, having a first input operatively connected to said second register for receiving the current prefix signal and having a second input operatively connected to said NOT circuit for receiving the current selection signal, for passing therethrough the current prefix signal upon receipt of the current selection signal.

* * * * *

UNITED STATES PATENT AND TRADEMARK OFFICE
CERTIFICATE OF CORRECTION

PATENT NO. : 4,347,565
DATED : August 31, 1982
INVENTOR(S) : SUBURO KANEDA ET AL.

It is certified that error appears in the above—identified patent and that said Letters Patent is hereby corrected as shown below:

```
Column 3, line 3, "input output" should be --input/out--;
          line 19, "therefor" should be --therefore--;
          line 46, "read-write" should be --read/write--.
Column 4, line 63, "the program status word describe" should be
--be described--;
          line 68, after "the" insert --program status word--.
Column 5, line 62, "porcessing" should be --processing--.
Column 7, line 4, "Thecomparator" should be --The comparator--.
Column 10, line 7, "procesing" should be --processing--.
```

Signed and Sealed this

Twenty-second Day of March 1983

[SEAL]

Attest:

GERALD J. MOSSINGHOFF

*Attesting Officer*   *Commissioner of Patents and Trademarks*

UNITED STATES PATENT AND TRADEMARK OFFICE
CERTIFICATE OF CORRECTION

PATENT NO. : 4,347,565
DATED : August 31, 1982
INVENTOR(S) : SUBURO KANEDA ET AL.

It is certified that error appears in the above-identified patent and that said Letters Patent is hereby corrected as shown below:

Front page, after "[22] Filed: Nov. 30, 1979" insert
--[30] Foreign Application Priority Data Dec. 1, 1978
[JP] Japan ..... 53/148834  --.

Signed and Sealed this

Seventh Day of June 1983

[SEAL]

Attest:

DONALD J. QUIGG

Attesting Officer

Acting Commissioner of Patents and Trademarks